US011756081B2

(12) United States Patent
Griffin et al.

(10) Patent No.: US 11,756,081 B2
(45) Date of Patent: Sep. 12, 2023

(54) RENDERING PRIVACY AWARE ADVERTISEMENTS IN MIXED REALITY SPACE

(71) Applicant: International Business Machines Corporation, Armonk, NY (US)

(72) Inventors: Adam Lee Griffin, Dubuque, IA (US); Shikhar Kwatra, Raleigh, NC (US); Vijay Ekambaram, Chennai (IN); Padmanabha Venkatagiri Seshadri, Mysore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 452 days.

(21) Appl. No.: 16/900,300

(22) Filed: Jun. 12, 2020

(65) Prior Publication Data

US 2021/0390587 A1    Dec. 16, 2021

(51) Int. Cl.
*G06Q 30/0251* (2023.01)
*G06T 19/00* (2011.01)
(Continued)

(52) U.S. Cl.
CPC ......... *G06Q 30/0271* (2013.01); *G06F 3/013* (2013.01); *G06N 3/044* (2023.01);
(Continued)

(58) Field of Classification Search
CPC .... G06Q 30/0271; G06V 40/20; G06F 3/013; G06N 3/0445; G06N 3/0454; G06T 19/006
See application file for complete search history.

(56) References Cited

U.S. PATENT DOCUMENTS 8,165,374 B1 * 4/2012 Wang ............... H04N 23/51
348/700
9,495,783 B1 * 11/2016 Samarasekera ......... G06T 7/246
(Continued)

FOREIGN PATENT DOCUMENTS

CN    102346898 A    2/2012
CN    106933357 A    7/2017
(Continued)

OTHER PUBLICATIONS

International Search Report and Written Opinion dated Sep. 1, 2021 in corresponding International Patent Application Serial No. PCT/CN2021/097945.
(Continued)

*Primary Examiner* — Ilana L Spar
*Assistant Examiner* — Allan J Woodworth, II
(74) *Attorney, Agent, or Firm* — Troutman Pepper Hamilton Sanders LLP (57) ABSTRACT

Embodiments provide a computer-implemented method for rendering advertisements in a Mixed Reality space, including: profiling a plurality of users in a smart home sharing the MR space; building a social network graph between the plurality of users; building a user embedding matrix based on the social network graph; recommending a plurality of first advertisements for one or more target users; building a joint embedding matrix across the plurality of users and the plurality of first advertisements; identifying a particular position and a particular time period for the one or more target user, while the remaining users are not viewing the particular position during the particular time period; selecting one or more advertisements from the plurality of first advertisements based on the joint embedding matrix; and rendering the one or more advertisements to the one or more
(Continued)

target users at the particular position during the particular time period.

14 Claims, 7 Drawing Sheets

(51) Int. Cl.
  *G06F 3/01* (2006.01)
  *G06V 40/20* (2022.01)
  *G06N 3/044* (2023.01)
  *G06N 3/045* (2023.01)

(52) U.S. Cl.
  CPC ........... *G06N 3/045* (2023.01); *G06T 19/006* (2013.01); *G06V 40/20* (2022.01)

(56) References Cited

U.S. PATENT DOCUMENTS

| | | | |
|---|---|---|---|
| 9,959,425 | B2 | 5/2018 | Singh et al. |
| 10,078,761 | B2 | 9/2018 | Bhagwan et al. |
| 10,453,098 | B2 | 10/2019 | Zomet et al. |
| 10,839,014 | B1 * | 11/2020 | Garcia Garcia ....... G06N 3/084 |
| 2005/0289590 | A1 | 12/2005 | Cheok et al. |
| 2006/0167747 | A1 | 7/2006 | Goodman et al. |
| 2012/0072936 | A1 | 3/2012 | Small et al. |
| 2012/0281129 | A1 * | 11/2012 | Wang ................... H04N 23/611 348/333.01 |
| 2016/0288707 | A1 * | 10/2016 | Matsumura ........... B60W 10/04 |
| 2017/0094588 | A1 * | 3/2017 | Naqvi ..................... H04W 4/80 |
| 2018/0033045 | A1 | 2/2018 | Flynn |
| 2018/0108079 | A1 * | 4/2018 | Traub ..................... G06V 20/20 |
| 2018/0322674 | A1 | 11/2018 | Du |
| 2018/0329908 | A1 * | 11/2018 | Tsukahara ............. G06F 16/487 |
| 2018/0349477 | A1 * | 12/2018 | Jaech .................. G06F 16/3334 |
| 2018/0349946 | A1 | 12/2018 | Nguyen et al. |
| 2019/0007724 | A1 | 1/2019 | Tidwell et al. |
| 2019/0080497 | A1 | 3/2019 | Lee |
| 2020/0249819 | A1 * | 8/2020 | Berquam .............. G06T 19/006 |
| 2020/0357183 | A1 * | 11/2020 | Weber ..................... G06F 3/013 |
| 2021/0173480 | A1 * | 6/2021 | Osterhout ............. G06F 3/0227 |

FOREIGN PATENT DOCUMENTS

| | | |
|---|---|---|
| CN | 110720110 A | 1/2020 |
| WO | 2018220576 A1 | 12/2018 |

OTHER PUBLICATIONS

Tran, M.D., "Privacy Challenges in Online Targeted Advertising," 2014.
Liu, B. et al., "AdReveal: Improving Transparency and Control in Online Targeted Advertising," 2017.
Liu, Y., "Privacy-Preserving Targeted Advertising for Mobile Devices," 2017.
Anonymously, "Method to Find and Propagate Short-Term Advertisements Using Social Collaboration," Nov. 6, 2019.
Anonymously, "Untargeted Advertisement," Dec. 4, 2013.
Kumar, KS. et al., "Method and System for Automatically Creating Groups of Users in a Social Network based on Location Information of Users in Future," Jul. 19, 2011.
Indian Office Action in Corresponding Indian Application No. 202247068425.

* cited by examiner

RENDERING PRIVACY AWARE ADVERTISEMENTS IN MIXED REALITY SPACE

TECHNICAL FIELD

The present application generally relates to rendering advertisements, and more particularly, to rendering privacy-aware advertisements in a Mixed Reality (MR) space.

BACKGROUND

Mixed Reality is becoming very common in gaming, education, and the Internet of things (IoT). Mixed Reality, also referred to as hybrid reality, is a combination of real and virtual worlds to produce new environments and visualizations where physical and digital objects co-exist and interact in real time. Mixed reality takes place not only in the physical world or the virtual world, but is a mix of reality and virtual reality, encompassing both augmented reality and augmented virtuality.

Marketing companies and researchers have recently started to look around and invest in advertising platforms in MR spaces to reach those MR audience members. The MR spaces are shared across several people or inhabitants, and for example, potentially within a smart home. Thus, privacy in the MR spaces is a critical issue that needs to be resolved by an advertisement rendering engine.

It is desired to introduce an approach of addressing privacy issues related to rendering advertisements in the MR spaces.

SUMMARY

Embodiments provide a computer-implemented method for rendering advertisements in a Mixed Reality (MR) space in a data processing system comprising a processor and a memory comprising instructions which are executed by the processor, the method comprising: detecting, by the processor, movements of each user in a plurality of users relative to other users in the plurality of users, wherein the plurality of users share the MR space; providing, by the processor, one or more advertisements having a private content for one or more target users selected from the plurality of users based on the detected movements; identifying, by the processor, a particular position and a particular time period for the one or more target user, wherein the particular position is only viewable by the one or more target users during the particular time period; and rendering, by the processor, the one or more advertisements having the private content to the one or more target users at the particular position during the particular time period.

Embodiments provide a computer-implemented method, wherein the step of providing one or more advertisements having a private content further comprising: profiling, by the processor, a plurality of users sharing the MR space; building, by the processor, a social network graph between the plurality of users, indicating a relationship between the plurality of users based on profiles of the plurality of users; building, by the processor, a user embedding matrix based on the social network graph; recommending, by the processor, a plurality of first advertisements for one or more target users, wherein the one or more target users are selected from the plurality of users; building, by the processor, an advertisement embedding matrix based on the plurality of first advertisements; building, by the processor, a joint embedding matrix across the plurality of users and the plurality of first advertisements; and selecting, by the processor, one or more advertisements from the plurality of first advertisements based on the joint embedding matrix.

Embodiments provide a computer-implemented method, further comprising: detecting, by the processor, movements of each target user by a motion detector.

Embodiments provide a computer-implemented method, further comprising: detecting, by the processor, eye-gaze movements of each user.

Embodiments provide a computer-implemented method, wherein the joint embedding matrix is built based on a Siamese network, wherein the Siamese network includes the user embedding matrix, the advertisement embedding matrix, a first long short-term memory (LSTM) network for the user embedding matrix, and a second LSTM network for the advertisement embedding matrix.

Embodiments provide a computer-implemented method, wherein the one or more advertisements are close to the one or more target user, but far away from the remaining users in the joint embedding matrix.

Embodiments provide a computer-implemented method, further comprising: caching, by the processor, the one or more advertisements to one or more hub points close to the particular position.

Embodiments provide a computer program product for rendering advertisements in a Mixed Reality (MR) space, the computer program product comprising a computer readable storage medium having program instructions embodied therewith, the program instructions executable by a processor to cause the processor to: detect movements of each user in a plurality of users relative to other users in the plurality of users, wherein the plurality of users share the MR space; provide one or more advertisements having a private content for one or more target users selected from the plurality of users based on the detected movements; identify one or more positions and a particular time period for the one or more target users, wherein the one or more positions are only viewable by the one or more target users during a particular time period; and cache the one or more advertisements having the private content to one or more hub points close to the one or more positions.

Embodiments provide a computer program product for rendering advertisements in a Mixed Reality (MR) space, wherein the step of providing one or more advertisements having a private content further causes the processor to profile a plurality of users sharing the MR space; build a social network graph between the plurality of users, indicating a relationship between the plurality of users based on profiles of the plurality of users; build a user embedding matrix based on the social network graph; recommend a plurality of first advertisements for one or more target users, wherein the one or more target users are selected from the plurality of users; build an advertisement embedding matrix based on the plurality of first advertisements; build a joint embedding matrix across the plurality of users and the plurality of first advertisements; build a temporal eye-gaze map relative to a plurality of positions in the MR space; and select one or more advertisements from the plurality of first advertisements based on the joint embedding matrix.

Embodiments provide a computer program product for rendering advertisements in a Mixed Reality (MR) space, wherein the processor is further caused to detect movements of each target user by a motion detector.

Embodiments provide a computer program product for rendering advertisements in a Mixed Reality (MR) space, wherein the processor is further caused to detect eye-gaze movements of each user.

Embodiments provide a computer program product for rendering advertisements in a Mixed Reality (MR) space, wherein the joint embedding matrix is built based on a Siamese network, wherein the Siamese network includes the user embedding matrix, the advertisement embedding matrix, a first long short-term memory (LSTM) network for the user embedding matrix, and a second LSTM network for the advertisement embedding matrix.

Embodiments provide a computer program product for rendering advertisements in a Mixed Reality (MR) space, wherein the one or more advertisements are close to the one or more target user, but far away from the remaining users in the joint embedding matrix.

Embodiments provide a computer program product for rendering advertisements in a Mixed Reality (MR) space, wherein the processor is further caused to render the one or more advertisements to the one or more target users from the one or more hub points.

In another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention may be a system, a method, and/or a computer program product implemented on a cognitive system. The computer program product may include a computer readable storage medium (or media) having computer readable program instructions thereon for causing a processor to carry out aspects of the present invention.

A Mixed Reality (MR) space of a particular user may be shared with other users (e.g., a husband's MR space is shared with his wife and children) within a smart home, where each user wears an MR headset. This disclosure provides an advertisement rendering system, method, and computer product, which can render advertisements to a target user, while preventing other users from viewing the advertisements, so as to protect the privacy of the target user. Further, this disclosure provides an advertisement rendering system, method, and computer product, which can identify one or more positions of the target users, so as to cache advertisements in one or more hub points near the identified positions for high-quality content delivery.

In an embodiment, advertisements can be rendered to a first user relative to a second user. For example, advertisements can be rendered to a first user at a particular position (spatial information) where the second user would not appear during a particular time period (temporal information), and thus the second user cannot see the advertisements. In this way, the privacy of the first user is protected.

In an embodiment, a joint embedding matrix for advertisements and users is generated to indicate a relationship between the advertisements and the users. In the joint embedding matrix, if a point representative of a first advertisement and a point representative of a first user is close to each other, then it indicates that the first user is interested in the first advertisement. By contrast, if a point representative of a second advertisement and a point representative of a second user is far away from each other, then it indicates that the second user is not interested in the second advertisement. The distance between a point representative of a particular advertisement and a point representative of a particular user indicates an interest level of the particular user towards the particular advertisement.

If the first user (e.g., husband) is interested in the first advertisement (e.g., a gift advertisement), while the second user (e.g., wife) is not interested in the first advertisement; then the first advertisement can be rendered to the first user, while the second user cannot see the first advertisement, so as to protect the privacy of the first user. Thus, the first advertisement can be rendered to a particular position during a particular time period when only the first user is at the particular position. The advertisement rendering system detects the dynamic movements of each user in the smart home, e.g., the advertisement rendering system detects the dynamic movements of the first user relative to the second user. In an embodiment, the dynamic movements can be detected by a motion detector that is an IoT device, e.g., a camera, a proximity sensor, a motion sensor, etc., installed in the smart home. When the advertisement rendering system detects that the first user is located at a position where the second user is absent during a particular time period, then the advertisement rendering system renders the first advertisement to the first user.

In an embodiment, to render high-quality contents for immersive experience, caching of contents in local hub points in a smart home may enable seamless delivery of the contents. To protect the privacy of the first user, the MR advertisements can be cached in various hub points where the first user often appears while the second user or other users generally are absent during a particular time period. The local hub points can quickly render high definition cached privacy-aware MR advertisements to the first user who is possibly interested in the advertisements.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human-readable language and identify inferences between text passages with human-like accuracy at speeds far faster than human beings and on a much larger scale. In general, such cognitive systems can perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language-specific or agnostic attributes from natural language

High degree of relevant recollection from data points (images, text, voice) (memorization and recall)

Figure 1:
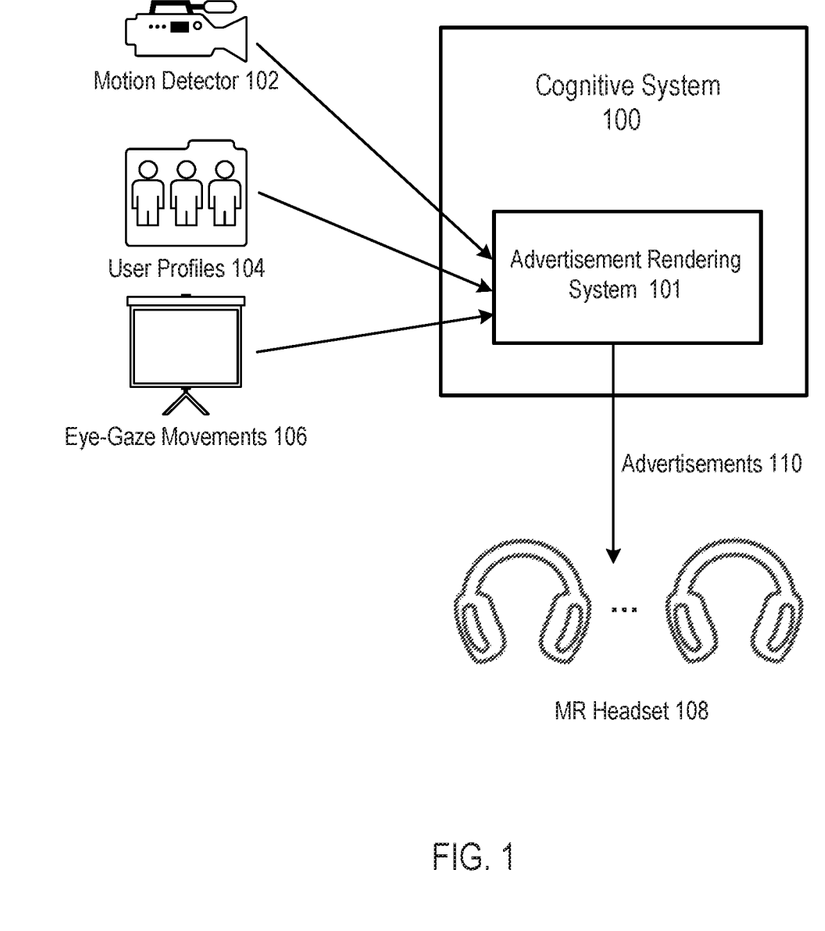
FIG. 1 depicts a schematic diagram of one illustrative embodiment of a cognitive system 100 implementing an exemplary advertisement rendering system 101.

Predict and sense with situation awareness that mimics human cognition based on experiences Answer questions based on natural language and specific evidence In one aspect, the cognitive system can be augmented with an advertisement rendering system. FIG. 1 depicts a schematic diagram of one illustrative embodiment of a cognitive system 100 implementing an exemplary advertisement rendering system 101. The cognitive system 100 is implemented on a computing device comprising one or more processors and one or more memories, and potentially any other computing device elements generally known in the art including buses, storage devices, communication interfaces, and the like. The cognitive system 100 is configured to implement an advertisement rendering system 101 that can automatically render privacy-aware advertisements to one or more target users. The advertisement rendering system 101 can get information of the motion detector 102, the user profiles 104, and the eye-gaze movements 106, and render advertisements 110 to one or more MR headsets 108 of one or more target users. The motion detector 102 is configured to detect movements of one or more target users relative to other users. The user profiles 104 can be obtained from social media (e.g., Facebook, Twitter, Instagram, etc.), and/or resume of each user, etc. The eye-gaze movements 106 of each user can be obtained from an MR software development kit (SDK) associated with the MR headset 108 that each user wears.

Figure 2:
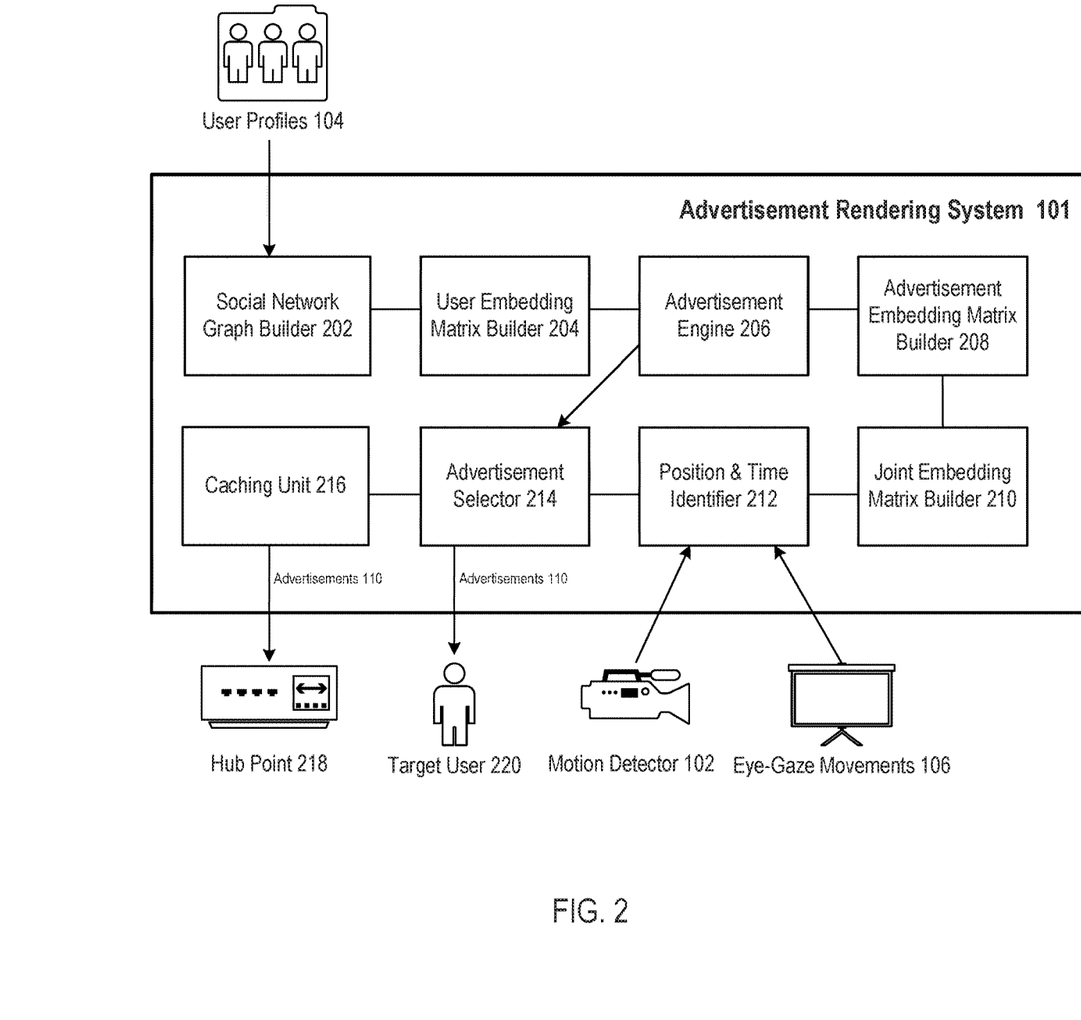
FIG. 2 depicts a schematic diagram of one illustrative embodiment of the advertisement rendering system 101, according to embodiments described herein.

FIG. 2 depicts a schematic diagram of one illustrative embodiment of the advertisement rendering system 101, according to embodiments described herein. As shown in FIG. 2, in an embodiment, the advertisement rendering system 101 includes social network graph builder 202, user embedding matrix builder 204, advertisement engine 206, advertisement embedding matrix builder 208, joint embedding matrix builder 210, position & time identifier 212, and advertisement selector 214. In another embodiment, the advertisement rendering system 101 further includes caching unit 216.

The social network graph builder 202 ingests the user profiles 104, and builds a social network graph between users, indicating a relationship between the users in the same smart home. The user embedding matrix builder 204 is configured to build a user embedding matrix based on the social network graph. The advertisement engine 206 is configured to recommend Top-K (e.g., top 20) advertisements that a target user may be interested in. The advertisements are recommended based on, e.g., what a target user is viewing, what a target user is browsing, or/and the user profile of the target user. The advertisement embedding matrix builder 208 is configured to build an advertisement embedding matrix based on the recommended advertisements. The joint embedding matrix builder 210 is configured to build a joint embedding matrix across users and advertisements, so as to determine a relationship between users and advertisements. The position & time identifier 212 ingests information of the motion detector 102 and eye-gaze movements 106, to identify a position and a time period for advertisement delivery to the target user 220, while other users are not viewing that position during the time period. The advertisement selector 214 is configured to select advertisements from the recommended Top-K (e.g., top 20) advertisements. The selected advertisements are close to the target user 220, but far away from other users, as depicted in the joint embedding matrix. In this way, the selected advertisements rendered to the target user 220 are contents of interest. The caching unit 216 is configured to cache the selected advertisements in one or more hub points 218 near the identified position.

Figure 3:
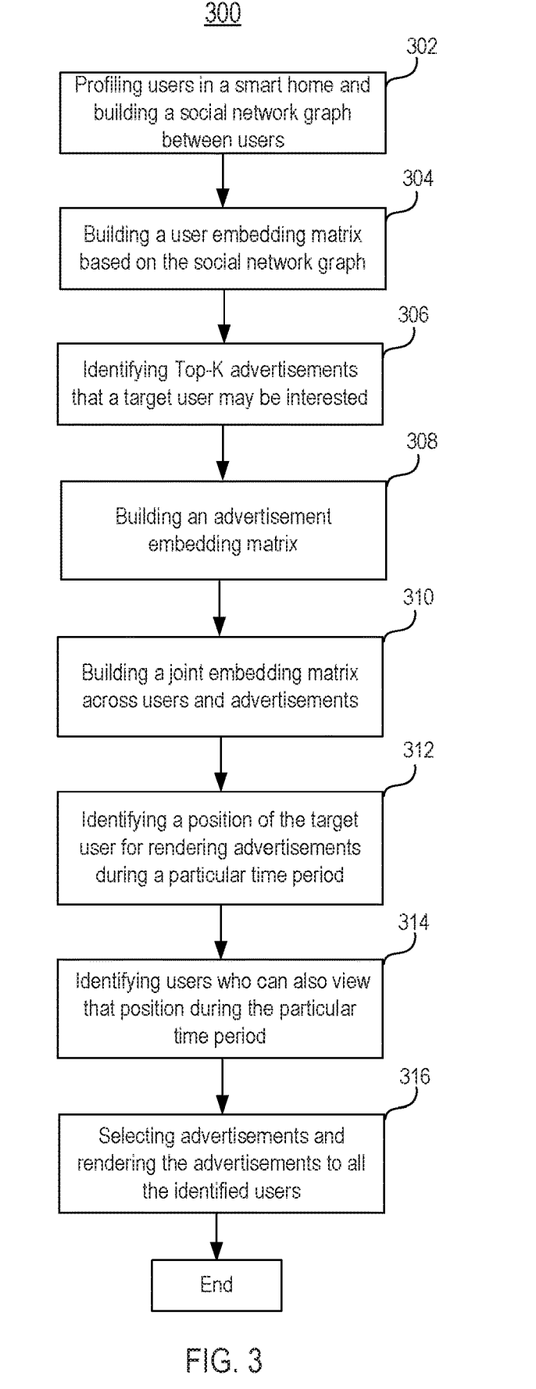
FIG. 3 illustrates a flowchart depicting a method 300 of rendering advertisements, according to embodiments described herein.

FIG. 3 illustrates a flowchart depicting a method 300 of rendering advertisements, according to embodiments described herein. At step 302, the advertisement rendering system profiles users in a smart home and builds a social network graph between users, indicating a relationship between the users in the same smart home. The advertisement rendering system can get a profile of each user automatically from social media, such as Facebook, Twitter, Instagram, etc. Each user can also manually configure profile information. Thus, a relationship between the users can be identified from the user profiles. For example, the husband-wife relationship, mother-child relationship, friends' relationship, etc., can be identified based on user profiles.

At step 304, the advertisement rendering system builds a user embedding matrix based on the social network graph. The advertisement rendering system captures user profiles to generate the user embedding matrix. In the user embedding matrix, two users having a very similar user profile have near-by embedding (i.e., less cosine similarity score).

At step 306, the advertisement rendering engine recommends Top-K (e.g., top 20) advertisements in which a target user may be interested using conventional approaches (e.g., based on eye-gaze movement, browsing patterns, profiles of a user, etc.). For example, eye-gaze movements can be detected to identify the content that the target user views, and the advertisement engine recommends the top 20 advertisements related to the content. For another example, browsing patterns can be used to identify the content the target user browses, and the advertisement engine recommends the top 30 advertisements related to the content. For another example, profiles of a user (e.g., mother of three children) can be used to recommend the top 40 advertisements related to the content (e.g., child care, cooking utensils, diapers, etc.), in which the target user may be interested.

At step 308, the advertisement rendering system builds an advertisement embedding matrix based on the recommended advertisements (e.g., top 20 advertisements). In the advertisement embedding matrix, two advertisements having similar contents have near-by embedding.

Figure 4:
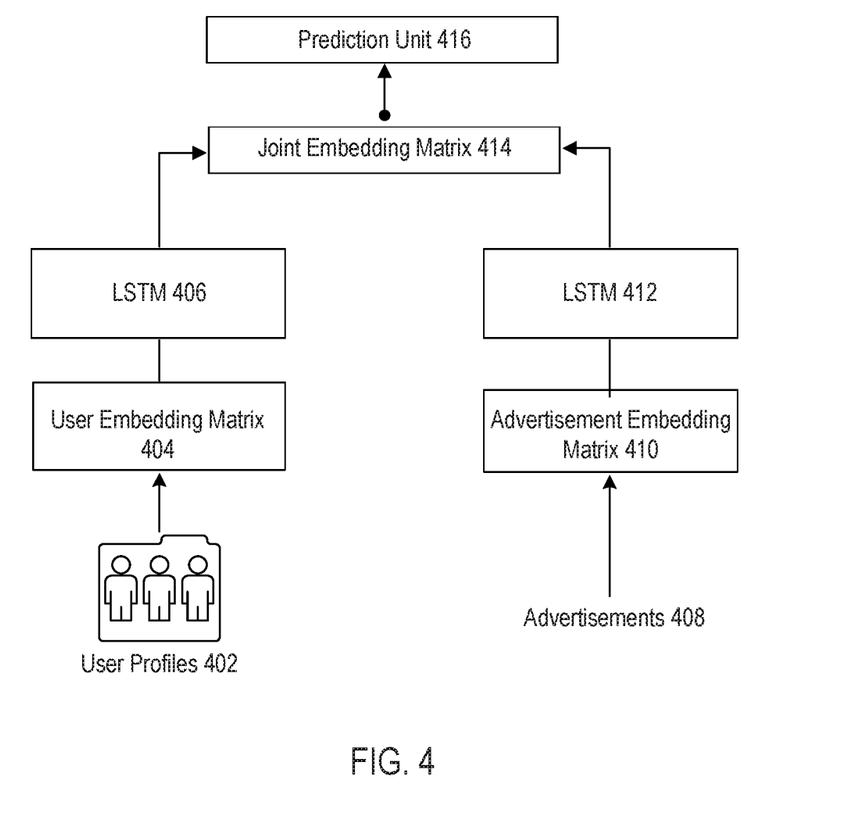
FIG. 4 illustrates an exemplary Siamese network for joint embedding, according to embodiments described herein.

At step 310, a conventional Siamese network (also referred to as "twin neural network") can be used to generate a joint embedding matrix across users and advertisements, so as to determine a relationship between users and advertisements (i.e., an interested level of a user relative to an advertisement). FIG. 4 illustrates an exemplary Siamese network for joint embedding, according to embodiments described herein. As shown in FIG. 4, a plurality of user profiles 402 are used to generate the user embedding matrix 404, which is then input into a first long short-term memory (LSTM) network 406 for deep learning. A plurality of advertisements 408 is used to generate the advertisement embedding matrix 410, which is then input into a second long short-term memory (LSTM) network 412 for deep learning. Manhattan distance is calculated between each user embedding point and each advertisement embedding point to form a joint embedding matrix 414. In the joint embedding matrix 414, if a user is interested in an advertisement, a joint embedding between the advertisement and the user lies as near-by points; otherwise, if a user is not interested in an advertisement, a joint embedding between the advertisement and the user lies as far-away points. The joint embedding matrix 414 is then inputted into the prediction unit 416 to determine whether a particular user is interested in a particular advertisement. For example, the output value of the prediction unit 416 is within a range [0, 1], wherein "0" indicates a user is not interested in an advertisement, while "1" indicates a user is very interested in an advertisement. If the output value is over a predefined threshold, e.g., "0.7," then the user is interested in the advertisement. In another embodiment, the LSTM network can be replaced by another artificial neural network, such as convolutional neural network (CNN), recursive neural network (RNN), sequence-to-sequence model, shallow neural network, or multilayer perceptron (MLP), etc.

At step 312, the advertisement rendering system detects movements of a target user (e.g., the husband) through a smart IoT device, e.g., motion detector, and identifies a position of the target user for rendering advertisements during a particular time period. The movements of each user are continuously detected by the motion detector.

At step 314, the advertisement rendering system identifies users who can also view that position during the particular time period. The users can be identified based on eye-gaze movements. Eye-gaze details are available in an MR software development kit (SDK).

At step 316, the advertisement rendering system selects advertisements from the recommended Top-K advertisements. The selected advertisements are close to the identified users in the joint embedding matrix (e.g., the output value of the prediction unit 416 for each advertisement is over 0.7), and renders the selected advertisements to the identified users at the identified position. Thus, the advertisements rendered at the identified position are viewable to all the identified users who can view that position, while being not viewable for the remaining users.

Figure 5:
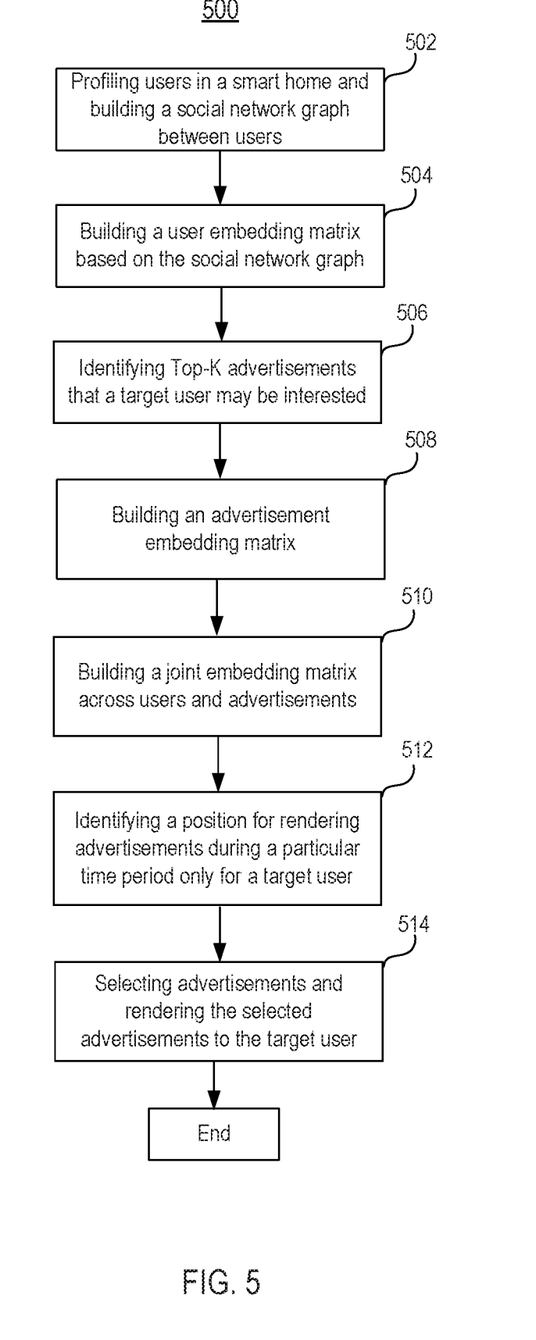
FIG. 5 illustrates a flowchart depicting another method 500 of rendering advertisements, according to embodiments described herein.

FIG. 5 illustrates a flowchart depicting another method 500 of rendering advertisements, according to embodiments described herein. Steps 502-510 are the same as the step 302-step 310.

At step 512, the advertisement rendering system detects movements of a target user (e.g., the husband) by a motion detector, and identifies a position of the target user for rendering advertisements during a particular time period, while other users are not viewing that position during the particular time period (e.g., eye-gaze movements of the other users are not identified).

At step 514, the advertisement rendering system selects advertisements that are close to the target user, but far away from other users based on the joint embedding matrix, and renders the selected advertisements to the target user at the identified position. Thus, the advertisements rendered at the identified position are only viewable by the target user, so that the privacy of the target user can be protected.

Figure 6:
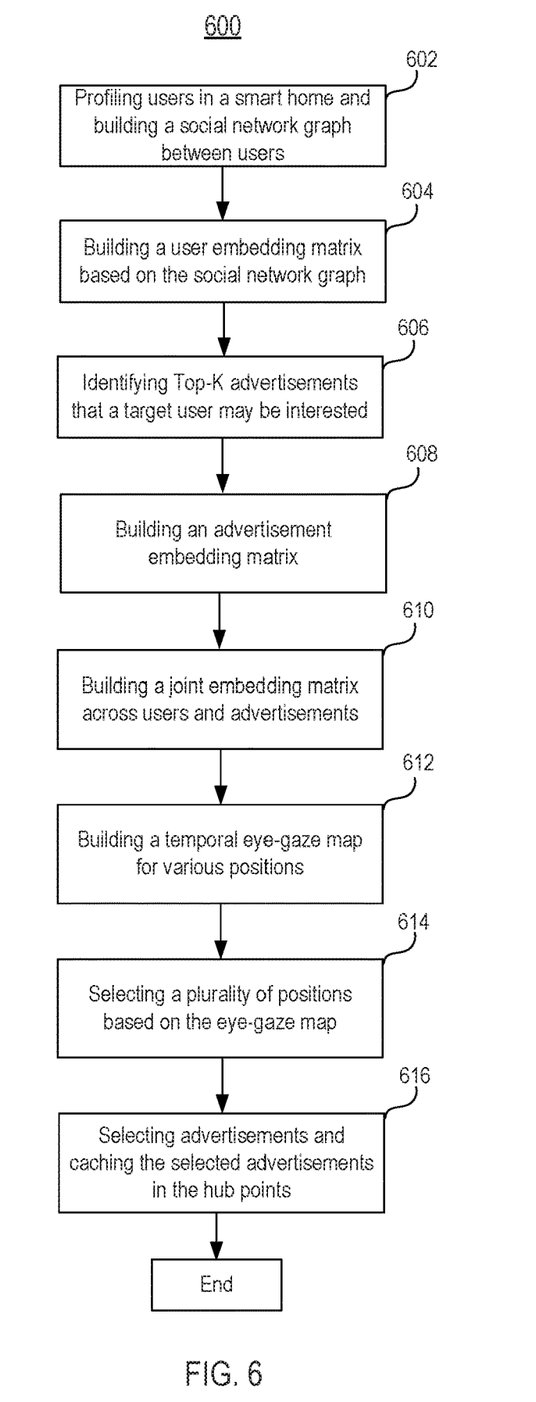
FIG. 6 illustrates a flowchart depicting a method 600 of caching advertisements, according to embodiments described herein.

FIG. 6 illustrates a flowchart depicting a method 600 of caching advertisements, according to embodiments described herein. Steps 602-610 are the same as the step 302-step 310.

At step 612, the advertisement rendering system detects movements of each user in a smart home by a smart IoT device, e.g., motion detector, and builds a temporal eye-gaze map for various positions in the smart home. The eye-gaze map captures each user viewing various positions relative to other users during various time periods.

At step 614, the advertisement rendering system selects a plurality of positions based on the temporal eye-gaze map, wherein the plurality of positions are only viewable by the target user during a particular time period, while other users are not viewing the plurality of positions during the particular time period.

At step 616, the advertisement rendering system selects advertisements that are close to the target user, but far away from other users based on the joint embedding matrix, and caches the selected advertisements in a plurality of hub points close to the plurality of positions.

In a specific example, if the husband is browsing a plethora of wedding gifts to surprise his wife, then rendering all these gift advertisements to the husband when his wife is near would spoil the surprise. Thus, all these gift advertisements are preferably delivered to the husband at a position where his wife does not appear during the delivery time period. The advertisement rendering system profiles the husband and the wife, and builds a user embedding matrix. The advertisement rendering system identifies the top 20 gift advertisements and builds an advertisement embedding matrix. A joint embedding matrix across users and advertisements is built based on the user embedding matrix and the advertisement embedding matrix. The advertisement rendering system identifies a position of the husband for rendering advertisements for 10 minutes, while the wife is not viewing that position within the 10 minutes or is physically far away from that position within the 10 minutes. The advertisement rendering system selects advertisements that are close to husband, but far away from the wife as depicted in the joint embedding matrix, and renders the selected advertisements to the husband at the identified position for 10 minutes.

In another specific example, the advertisement rendering system detects movements of the husband and the wife, and builds a temporal eye-gaze map for various positions in the smart home. The advertisement rendering system selects one or more positions based on the temporal eye-gaze map, wherein the one or more positions are only viewable by the husband for 15 minutes, while the wife is not viewing the one or more positions within the 15 minutes or is physically far away from the one or more positions within the 15 minutes. The advertisement rendering system selects advertisements that are close to husband, but far away from the wife as depicted in the joint embedding matrix, and caches the selected advertisements for the husband in one or more hub points close to the one or more positions. Caching the surprise gift advertisements in one or more hub points where the chances of the husband being alone would be beneficial and enhance the privacy of the husband.

Figure 7:
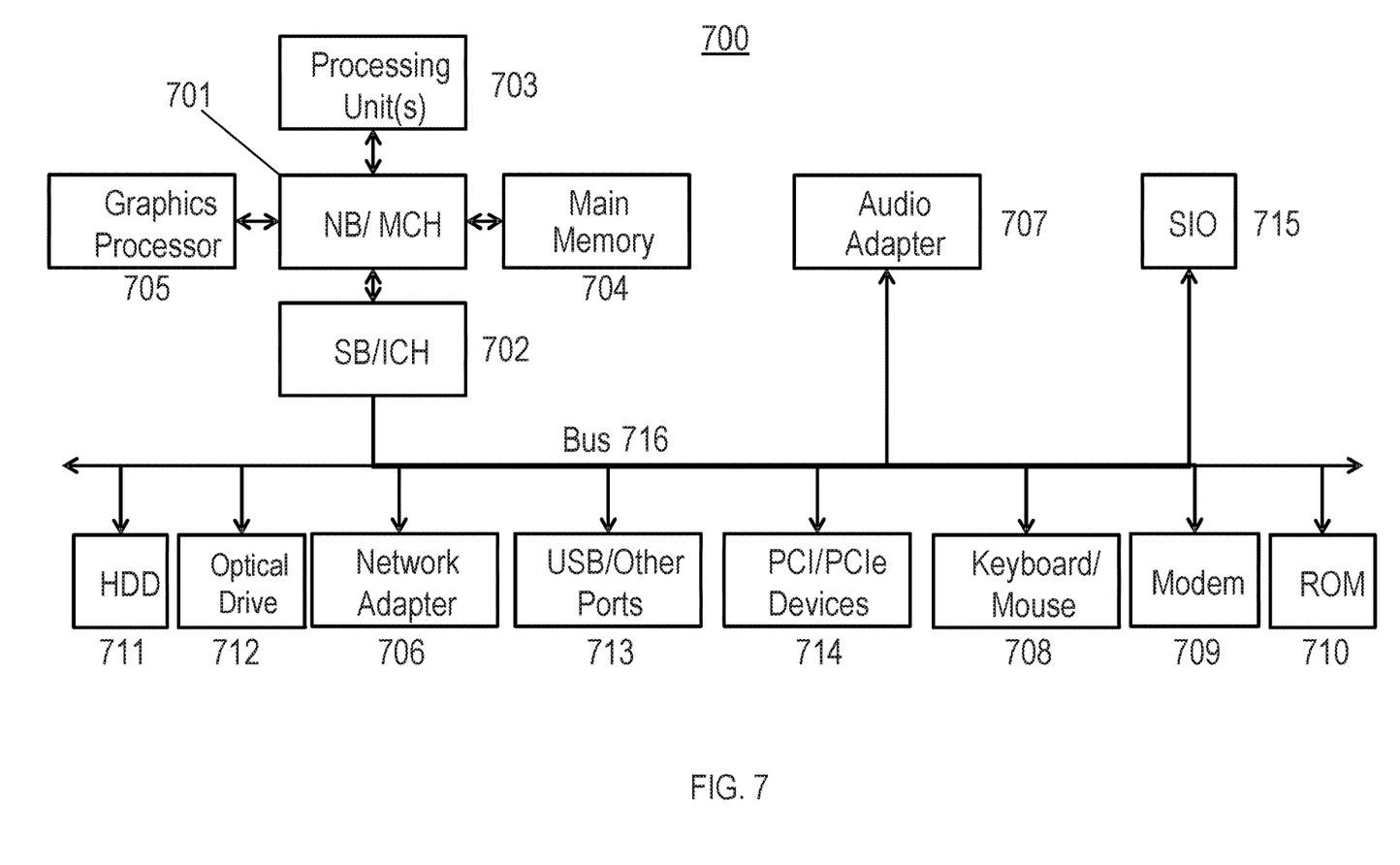
FIG. 7 is a block diagram of an example data processing system 700 in which aspects of the illustrative embodiments are implemented.

FIG. 7 is a block diagram of an example data processing system 700 in which aspects of the illustrative embodiments are implemented. Data processing system 700 is an example of a computer, such as a server or a client, in which computer usable code or instructions implementing the process for illustrative embodiments of the present invention are located. In one embodiment, FIG. 7 represents a server computing device, such as a server, which implements the advertisement rendering system 101 and cognitive system 100 described herein.

In the depicted example, the data processing system 700 can employ a hub architecture including a north bridge and memory controller hub (NB/MCH) 701 and south bridge and input/output (I/O) controller hub (SB/ICH) 702. Processing unit 703, main memory 704, and graphics processor 705 can be connected to the NB/MCH 701. Graphics processor 705 can be connected to the NB/MCH 701 through an accelerated graphics port (AGP) (not shown in FIG. 7).

In the depicted example, the network adapter 706 connects to the SB/ICH 702. The audio adapter 707, keyboard and mouse adapter 708, modem 709, read-only memory (ROM) 710, hard disk drive (HDD) 711, optical drive (CD or DVD) 712, universal serial bus (USB) ports and other communication ports 713, and the PCI/PCIe devices 714 can connect to the SB/ICH 702 through bus system 716. PCI/PCIe devices 714 may include Ethernet adapters, add-in cards, and PC cards for notebook computers. ROM 710 may be, for example, a flash basic input/output system (BIOS). The HDD 711 and optical drive 712 can use an integrated drive electronics (IDE) or serial advanced technology attachment (SATA) interface. The super I/O (SIO) device 715 can be connected to the SB/ICH.

An operating system can run on processing unit 703. The operating system can coordinate and provide control of various components within the data processing system 700. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the data processing system 700 can be an IBM® eServer™ System p® running the Advanced Interactive Executive operating system or the Linux operating system. The data processing system 700 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments of the full question generation system can be performed by the processing unit 703 using computer usable program code, which can be located in a memory such as, for example, main memory 704, ROM 710, or in one or more peripheral devices.

A bus system 716 can be comprised of one or more busses. The bus system 716 can be implemented using any type of communication fabric or architecture that can provide for a transfer of data between different components or devices attached to the fabric or architecture. A communication unit such as the modem 709 or network adapter 706 can include one or more devices that can be used to transmit and receive data.

Those of ordinary skill in the art will appreciate that the hardware depicted in FIG. 7 may vary depending on the implementation. For example, the data processing system 700 includes several components that would not be directly included in some embodiments of the advertisement rendering system 101. However, it should be understood that the advertisement rendering system 101 may include one or more of the components and configurations of the data processing system 700 for performing processing methods and steps in accordance with the disclosed embodiments.

Moreover, other internal hardware or peripheral devices, such as flash memory, equivalent non-volatile memory, or optical disk drives, may be used in addition to or in place of the hardware depicted. Moreover, the data processing system 700 can take the form of any of a number of different data processing systems, including but not limited to, client computing devices, server computing devices, tablet computers, laptop computers, telephone or other communication devices, personal digital assistants, and the like. Essentially, the data processing system 700 can be any known or later developed data processing system without architectural limitation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in rendering of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for rendering advertisements in a Mixed Reality (MR) space in a data processing system comprising a processor and a memory comprising instructions which are executed by the processor, the method comprising:
   detecting, by the processor, movements of each user in a plurality of users relative to other users in the plurality of users, wherein the plurality of users share the MR space;
   providing, by the processor, one or more advertisements having a private content for one or more target users selected from the plurality of users based on the detected movements by:
      profiling, by the processor, the plurality of users sharing the MR space,
      building, by the processor, a social network graph between the plurality of users, indicating a relationship between the plurality of users based on profiles of the plurality of users,
      building, by the processor, a user embedding matrix based on the social network graph,
      recommending, by the processor, a plurality of first advertisements for the one or more target users, wherein the one or more target users are selected from the plurality of users,
      building, by the processor, an advertisement embedding matrix based on the plurality of first advertisements,
      building, by the processor, a joint embedding matrix across the plurality of users and the plurality of first advertisements, wherein the joint embedding matrix is built based on a Siamese network, wherein the Siamese network includes the user embedding matrix, the advertisement embedding matrix, a first long short-term memory (LSTM) network for the user embedding matrix, and a second LSTM network for the advertisement embedding matrix, and
      selecting, by the processor, the one or more advertisements from the plurality of first advertisements based on the joint embedding matrix,;
   identifying, by the processor, a particular position and a particular time period for the one or more target user, wherein the particular position is viewable by the one or more target users during the particular time period and not viewed by one or more untargeted users selected from the plurality of users during the particular time period; and
   rendering, by the processor, the one or more advertisements having the private content to the one or more target users at the particular position during the particular time period.

2. The method of claim 1, further comprising:
   detecting, by the processor, movements of each target user by a motion detector.

3. The method of claim 1, further comprising:
   detecting, by the processor, eye-gaze movements of each of the plurality of users.

4. The method of claim 1, wherein the one or more advertisements are close to the one or more target users, but far away from remaining users in the joint embedding matrix.

5. The method of claim 1, further comprising:
   caching, by the processor, the one or more advertisements to one or more hub points close to the particular position.

6. A computer program product for rendering advertisements in a Mixed Reality (MR) space, the computer program product comprising a computer readable storage medium having program instructions embodied therewith, the program instructions executable by a processor to cause the processor to:
   detect movements of each user in a plurality of users relative to other users in the plurality of users, wherein the plurality of users share the MR space;
   provide one or more advertisements having a private content for one or more target users selected from the plurality of users based on the detected movements, wherein providing the one or more advertisements having the private content further causes the processor to
      profile the plurality of users sharing the MR space,
      build a social network graph between the plurality of users, indicating a relationship between the plurality of users based on profiles of the plurality of users,
      build a user embedding matrix based on the social network graph,
      recommend a plurality of first advertisements for the one or more target users, wherein the one or more target users are selected from the plurality of users,
      build an advertisement embedding matrix based on the plurality of first advertisements,
      build a joint embedding matrix across the plurality of users and the plurality of first advertisements, wherein the joint embedding matrix is built based on a Siamese network, wherein the Siamese network includes the user embedding matrix, the advertisement embedding matrix, a first long short-term memory (LSTM) network for the user embedding matrix, and a second LSTM network for the advertisement embedding matrix
      build a temporal eye-gaze map relative to a plurality of positions in the MR space, and
      select the one or more advertisements from the plurality of first advertisements based on the joint embedding matrix;
   identify one or more positions and a particular time period for the one or more target users, wherein the one or more positions are viewable by the one or more target users during the particular time period and not viewed by one or more untargeted users selected from the plurality of users during the particular time period; and
   cache the one or more advertisements having the private content to one or more hub points close to the one or more positions.

7. The computer program product as recited in claim 6, wherein the processor is further caused to detect movements of each target user by a motion detector.

8. The computer program product as recited in claim 6, wherein the processor is further caused to detect eye-gaze movements of each user.

9. The computer program product as recited in claim 6, wherein the one or more advertisements are close to the one or more target users, but far away from remaining users in the joint embedding matrix.

10. The computer program product as recited in claim 6, wherein the processor is further caused to render the one or more advertisements to the one or more target users from the one or more hub points.

11. A system for rendering advertisements in a Mixed Reality (MR) space, comprising:
a processor configured to:
detect movements of each user in a plurality of users relative to other users in the plurality of users, wherein the plurality of users share the MR space;
provide one or more advertisements having a private content for one or more target users selected from the plurality of users based on the detected movements, wherein providing the one or more advertisements having the private content further causes the processor to:
profile the plurality of users sharing the MR space,
build a social network graph between the plurality of users, indicating a relationship between the plurality of users based on profiles of the plurality of users,
build a user embedding matrix based on the social network graph,
recommend a plurality of first advertisements for the one or more target users, wherein the one or more target users are selected from the plurality of users,
build an advertisement embedding matrix based on the plurality of first advertisements,
build a joint embedding matrix across the plurality of users and the plurality of first advertisements, wherein the joint embedding matrix is built based on a Siamese network, wherein the Siamese network includes the user embedding matrix, the advertisement embedding matrix, a first long short-term memory (LSTM) network for the user embedding matrix, and a second LSTM network for the advertisement embedding matrix,
build a temporal eye-gaze map relative to a plurality of positions in the MR space, and
select the one or more advertisements from the plurality of first advertisements based on the joint embedding matrix;
identify one or more positions and a particular time period for the one or more target users, wherein the one or more positions are viewable by the one or more target users during the particular time period and not viewed by one or more untargeted users selected from the plurality of users during the particular time period;
cache the one or more advertisements having the private content to one or more hub points close to the one or more positions; and
render the one or more advertisements to the one or more target users from the one or more hub points.

12. The system as recited in claim 11, wherein the processor is further configured to detect movements of each target user by a motion detector.

13. The system as recited in claim 11, wherein the processor is further configured to detect eye-gaze movements of each user.

14. The system as recited in claim 11, wherein the one or more advertisements are close to the one or more target users, but far away from remaining users in the joint embedding matrix.

* * * * *